United States Patent
Kojima et al.

(10) Patent No.: US 9,723,517 B2
(45) Date of Patent: Aug. 1, 2017

(54) APPARATUS AND METHOD FOR DISTRIBUTING DATA VIA DIFFERENT COMMUNICATION METHODS

(71) Applicant: FUJITSU LIMITED, Kawasaki-shi, Kanagawa (JP)

(72) Inventors: Yuji Kojima, Kawasaki (JP); Takeshi Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 192 days.

(21) Appl. No.: 14/803,855

(22) Filed: Jul. 20, 2015

(65) Prior Publication Data
US 2016/0044636 A1 Feb. 11, 2016

(30) Foreign Application Priority Data
Aug. 7, 2014 (JP) ................. 2014-161242

(51) Int. Cl.
  H04W 4/00 (2009.01)
  H04W 28/08 (2009.01)
  H04L 1/00 (2006.01)
  H04L 1/18 (2006.01)

(52) U.S. Cl.
  CPC ........... *H04W 28/08* (2013.01); *H04L 1/0003* (2013.01); *H04L 1/1867* (2013.01)

(58) Field of Classification Search
None
See application file for complete search history.

(56) References Cited

FOREIGN PATENT DOCUMENTS

| JP | 2001-298472 A | 10/2001 |
| JP | 2003-324473 A | 11/2003 |
| JP | 2004-128579 A | 4/2004 |
| JP | 2008-283325 A | 11/2008 |

OTHER PUBLICATIONS

Kawasaki et al., "Evaluation of LTE-WLAN Link Aggregation provided by LTE Femto cell base station", The Institute of Electronics, Information and Communication Engineers, Mar. 2013, pp. 667.

*Primary Examiner* — Minh-Trang Nguyen
(74) *Attorney, Agent, or Firm* — Arent Fox LLP

(57) ABSTRACT

An apparatus performs in parallel a first communication conforming to a first wireless communication method and a second communication conforming to a second wireless communication method by distributing transmission data to the first communication and the second communication so that first and second transmission data are distributed to the first and second communications, respectively. The apparatus detects an unallocated data amount indicating an amount of a first portion of the first transmission data that is different from a second portion of the first transmission data that is allocated to wireless resources of the first communication. The apparatus controls, based on the detected unallocated data amount, a ratio of an amount of the first transmission data distributed to the first communication, to a total amount of transmission data distributed to both the first and second communications.

13 Claims, 10 Drawing Sheets

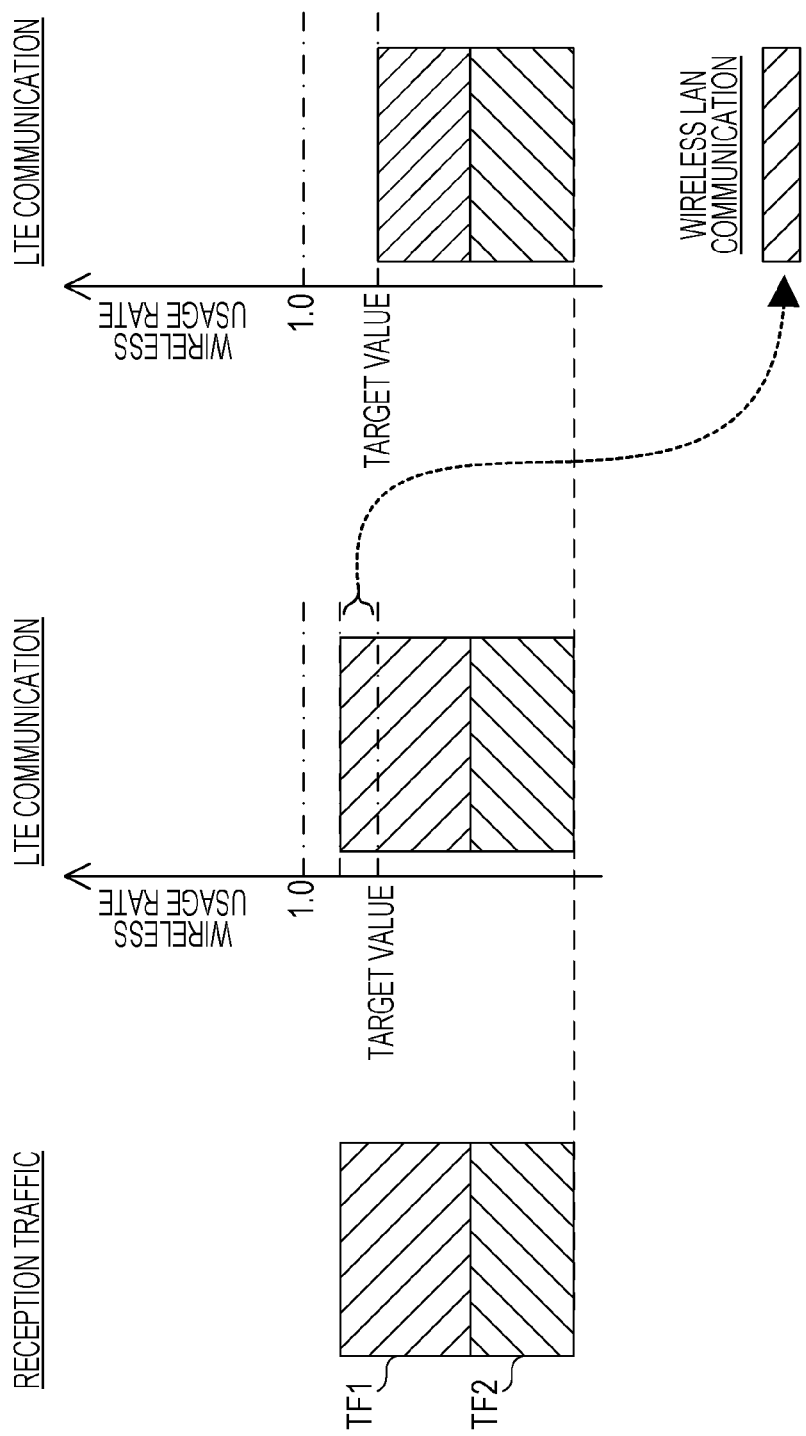

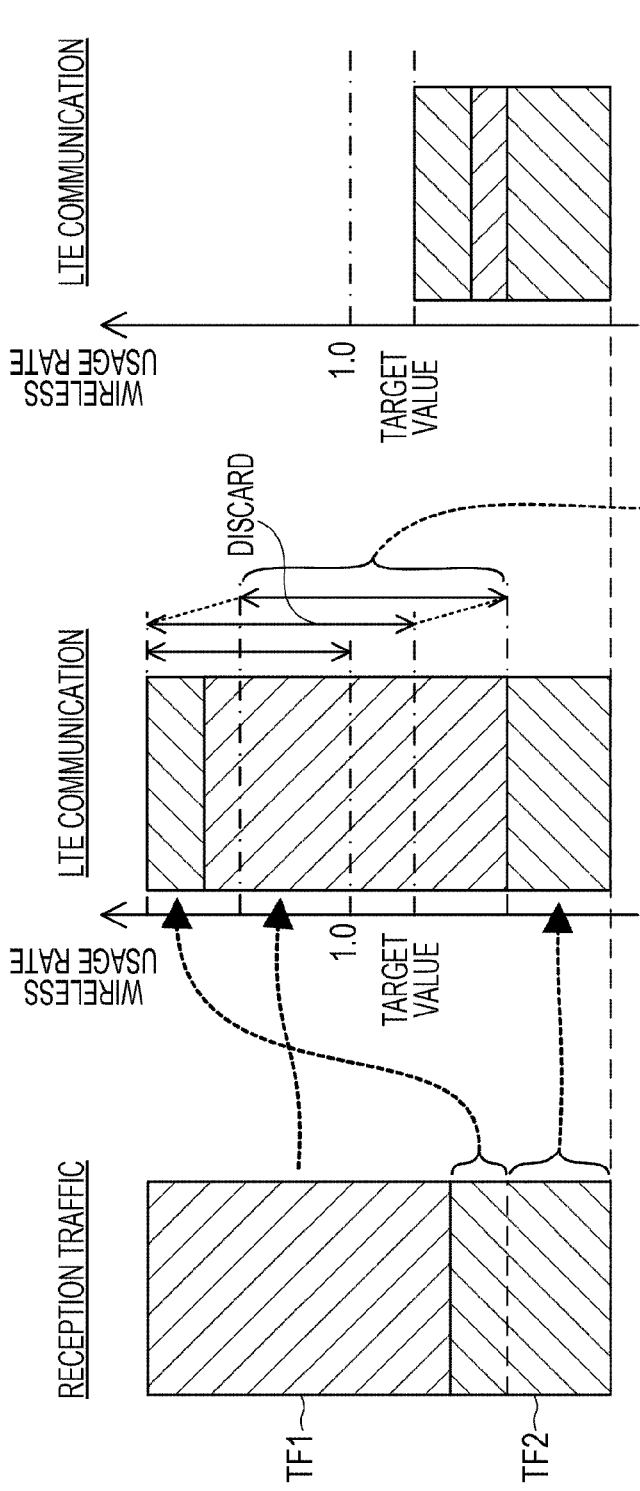

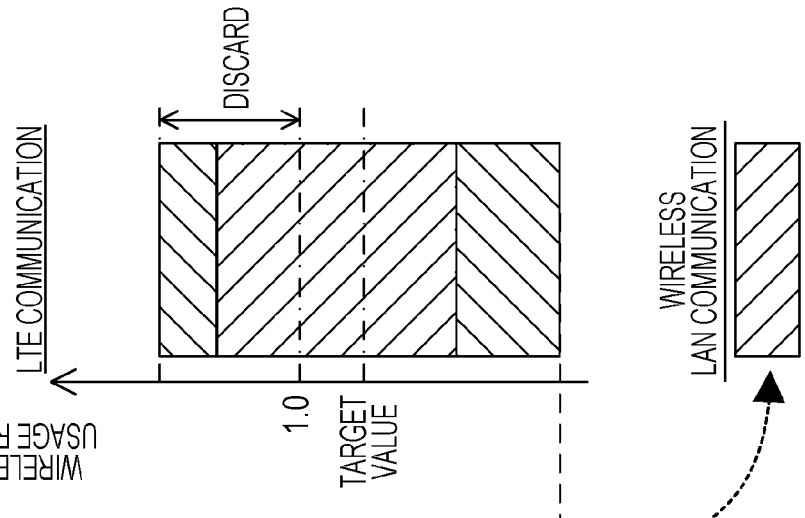
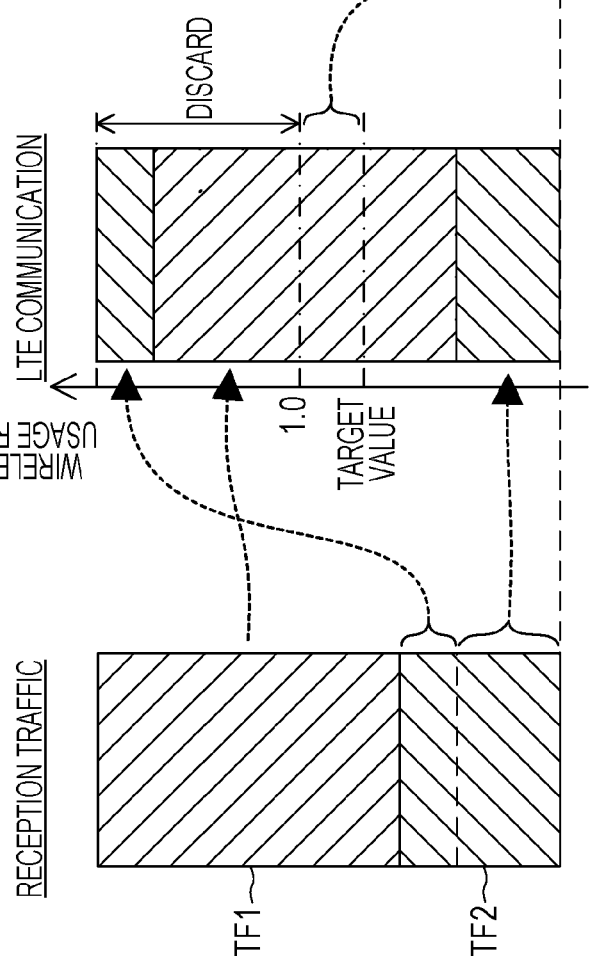
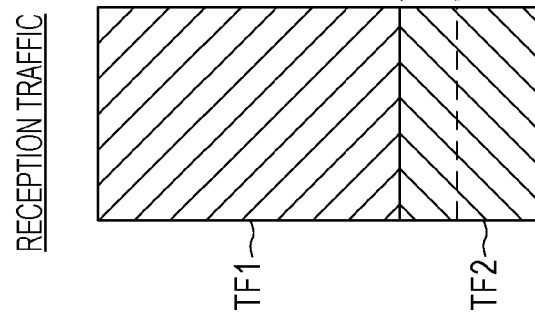

APPARATUS AND METHOD FOR DISTRIBUTING DATA VIA DIFFERENT COMMUNICATION METHODS

CROSS-REFERENCE TO RELATED APPLICATION

This application is based upon and claims the benefit of priority of the prior Japanese Patent Application No. 2014-161242, filed on Aug. 7, 2014, the entire contents of which are incorporated herein by reference.

FIELD

The embodiments discussed herein are related to apparatus and method for distributing data via different communication methods.

BACKGROUND

There has been known a wireless communication system including a base station and a mobile station, in which, by distributing transmission data to a plurality of communications whose wireless communication methods are different from one another, the plurality of communications are performed in parallel (see, for example, Japanese Laid-open Patent Publication No. 2004-128579 and Kawasaki, Takeshi; Suga, Junichi; Kojima, Yuji; Okuda, Masato, "Evaluation of LTE-WLAN Link Aggregation provided by LTE Femto cell base station", *Proceedings of the IEICE General Conference, Communication* (1), The Institute of Electronics, Information and Communication Engineers, B-17-23, p. 667, March 2013). The wireless communication system performs in parallel a first communication conforming to a cellular communication system and a second communication conforming to a wireless local area network (LAN) system.

The base station controls a distribution ratio indicating a ratio between the amount of transmission data distributed to the first communication and the amount of transmission data distributed to the second communication so that a wireless usage rate in the first communication becomes less than or equal to a target value. The wireless usage rate indicates a ratio of the amount of wireless resources allocated to transmission data to the amount of available wireless resources.

SUMMARY

According to an aspect of the invention, an apparatus performs in parallel a first communication conforming to a first wireless communication method and a second communication conforming to a second wireless communication method by distributing transmission data to the first communication and the second communication so that first and second transmission data are distributed to the first and second communications, respectively. The apparatus detects an unallocated data amount indicating an amount of a first portion of the first transmission data that is different from a second portion of the first transmission data that is allocated to wireless resources of the first communication. The apparatus controls, based on the detected unallocated data amount, a ratio of an amount of the first transmission data distributed to the first communication, to a total amount of transmission data distributed to both the first and second communications.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8A to 8C are diagrams each illustrating an example of an amount of wireless resources used in a wireless communication system, according to an embodiment;

FIGS. 9A to 9C are diagrams each illustrating an example of an amount of wireless resources used in a wireless communication system, according to an embodiment;

FIGS. 10A to 10C are diagrams each illustrating an example of an amount of wireless resources used in a comparative example;

DESCRIPTION OF EMBODIMENTS

Figure 1:
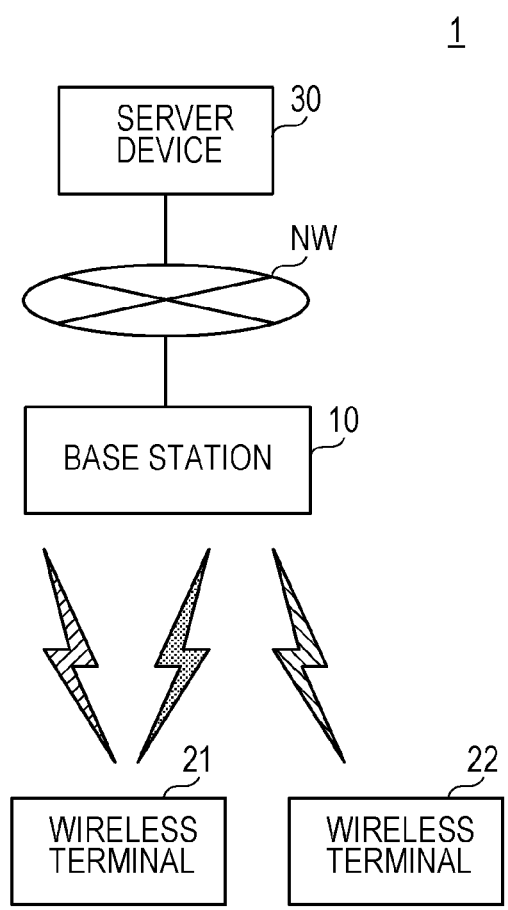
FIG. 1 is a diagram illustrating an example of a configuration of a wireless communication system, according to an embodiment.

In a case where transmission data whose amount is greater than the amount of data that is able to be transmitted to a mobile station by the first communication is distributed to the first communication, a base station fails to allocate all the distributed transmission data to wireless resources. In this case, for example, transmission data that has failed to be allocated to wireless resources is discarded in some cases. The amount of transmission data that has failed to be allocated to wireless resources is not reflected in the wireless usage rate.

Accordingly, in a case where, even if the distribution ratio is controlled based on the wireless usage rate, there exists transmission data unallocated to wireless resources, the amount of transmission data to be distributed to the second communication is not fully increased. Accordingly, a state in which the amount of transmission data distributed to the first communication is larger than the target value tends to continue. As a result, it is difficult to improve a throughput defined as the amount of data that is transmitted in a unit of time by communication from the base station to the mobile station.

Hereinafter, embodiments of the present technology will be described with reference to drawings. In this regard, however, the embodiments described hereafter are exemplifications. Accordingly, various modifications and technologies, which are not specified hereafter, may be applied to the embodiments. Note that, in the drawings used in the following embodiments, a portion to which the same symbol is assigned indicates the same or similar portion as long as an alteration or a modification is not specified.

First Embodiment

Configuration

As illustrated in FIG. 1, a wireless communication system 1 according to a first embodiment includes a base station 10, wireless terminals 21 and 22 (two in the embodiment), and a server device 30. The base station 10 is an example of a communication device. The wireless terminals 21 and 22 are examples of communication devices serving as communication destinations for the base station 10.

The number of wireless terminals included in the wireless communication system 1 may be one or three or more. The number of base stations included in the wireless communication system 1 may be two or more. The number of server devices included in the wireless communication system 1 may be two or more.

The wireless communication system 1 performs a plurality of communications conforming to wireless communication methods, between the base station 10 and the wireless terminals 21 and 22. The wireless communication methods include a first wireless communication method and a second wireless communication method. In the embodiment, the first wireless communication method is a Long Term Evolution (LTE) method.

In the embodiment, the second wireless communication method is a wireless local area network (LAN) method (for example, an IEEE 802.11 series, an IEEE 802.15 series, or the like). The IEEE is an abbreviation for "Institute of Electrical and Electronics Engineers". The wireless LAN method may be, for example, a WiFi (registered trademark) method. The WiFi is an abbreviation for "Wireless Fidelity".

In the embodiment, a first communication conforming to the first wireless communication method may be expressed as cellular communication or LTE communication. In the embodiment, a second communication conforming to the second wireless communication method may be expressed as non-cellular communication or wireless LAN communication.

Note that the wireless communication system 1 may perform wireless communication between the base station 10 and the wireless terminals 21 and 22 in accordance with three or more wireless communication methods. In addition, the wireless communication system 1 may perform communication conforming to another wireless communication method as one of the wireless communication methods. The other wireless communication methods include, for example, LTE-Advanced, WiMAX, 3G, 2G, GSM (registered trademark), EDGE, W-CDMA, UMTS, cdmaOne, and CDMA2000.

The WiMAX is an abbreviation for "Worldwide Interoperability for Microwave Access". The 3G is an abbreviation for "3rd Generation". The 2G is an abbreviation for "2nd Generation". The GSM is an abbreviation for "Global System for Mobile Communications". The EDGE is an abbreviation for "Enhanced Data Rates for GSM Evolution". The W-CDMA is an abbreviation for "Wideband Code Division Multiple Access". The UMTS is an abbreviation for "Universal Mobile Telecommunications System".

In the embodiment, the base station 10 is a femto base station. In the embodiment, the base station 10 is able to perform in parallel (for example, simultaneously) a first communication conforming to a first wireless communication method and a second communication conforming to a second wireless communication method, with the wireless terminal 21 or 22.

The base station 10 is communicably coupled to the server device 30 through a communication network NW. In the embodiment, the communication network NW is an internet protocol (IP) network. Note that the base station 10 may be an evolved Node B (eNB), a Node B (NB), a macro base station, a micro base station, a nano base station, a pico base station, a home base station, or a small base station. The base station 10 may be expressed as a wireless base station or an access point.

In the embodiment, the base station 10 forms a wireless area. The wireless area may be expressed as a coverage area or a communication area. In addition, the wireless area may be expressed as a cell, such as a macrocell, a microcell, a nanocell, a picocell, a femtocell, a home cell, a small cell, or a sector cell. A wireless area for the first communication may be different from a wireless area for the second communication, or may coincide with the wireless area for the second communication.

A portion located on the communication network NW's side (in other words, an upper side) of the base station 10 within the wireless communication system 1 may be expressed as EPC. The EPC is an abbreviation for "Evolved Packet Core". A portion formed by the base station 10 within the wireless communication system 1 may be expressed as E-UTRAN. The E-UTRAN is an abbreviation for "Evolved Universal Terrestrial Radio Access Network".

In the embodiment, each of the wireless terminals 21 and 22 may be expressed as a wireless apparatus, a wireless device, a mobile station, a mobile terminal, a terminal device, or a user terminal (user equipment: UE). Wireless terminals 21 and 22 include, for example, a mobile phone, a smartphone, a sensor, and a meter (measuring instrument). Each of the wireless terminals 21 and 22 may be carried by a user, may be mounted on a moving object such as a vehicle, or may be fixed.

The base station 10 is able to perform wireless communication with the wireless terminals 21 and 22 located in the wireless area formed by the base station 10.

Specifically, using wireless resources predetermined for individual wireless communication methods in the wireless area formed by the base station 10, the base station 10 performs communication with wireless terminals 21 and 22 located within the wireless area. In the embodiment, the wireless resources are identified by time and frequencies.

The base station 10 allocates, for example, a portion of wireless resources predetermined for the first wireless communication method to communication between the wireless terminal 21 and the base station 10, and performs communication with the wireless terminal 21 by using the allocated wireless resources. In the same way, the base station 10 allocates, for example, another portion of wireless resources predetermined for the first wireless communication method to communication between the wireless terminal 22 and the base station 10, and performs communication with the wireless terminal 22 by using the allocated wireless resources.

The base station 10 selects a portion of wireless resources predetermined for the second wireless communication method, and transmits data to the wireless terminal 21 or 22 by using the selected wireless resources. In the same way, the wireless terminal 21 or 22 selects a portion of wireless resources predetermined for the second wireless communication method and transmits data to the base station 10 by using the selected wireless resources.

Note that selection of wireless resources used for transmitting data is an example of assignment of data to wireless resources. In addition, a state in which the wireless terminal 21 (or 22) is located in the wireless area formed by the base station 10 may be represented that the wireless terminal 21 (or 22) belongs to the wireless area or the wireless terminal 21 (or 22) is connected to the base station 10 in the wireless area.

Configuration: Base Station 10

Next, a configuration of the base station 10 will be described.

Figure 2:
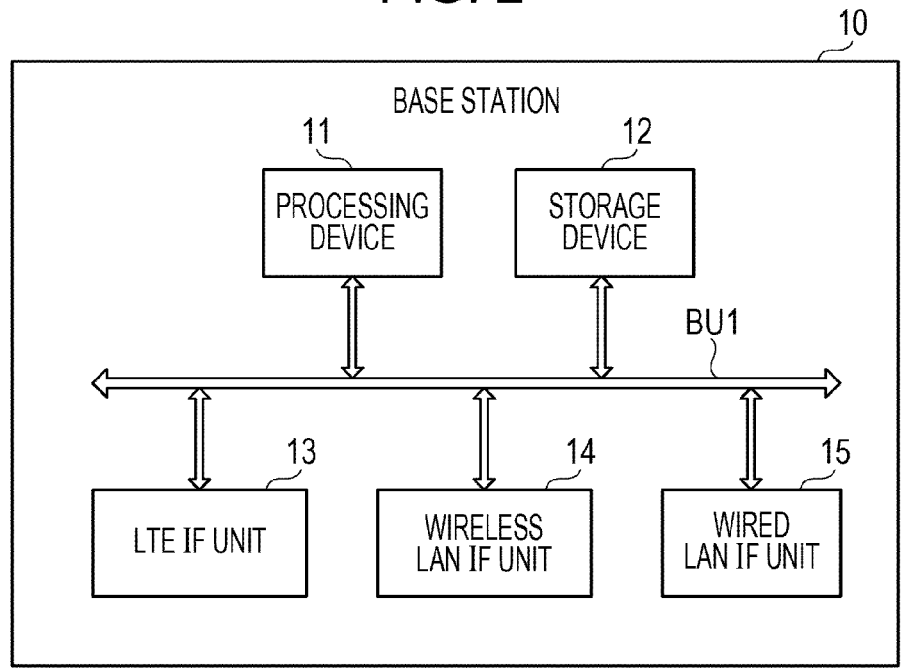
FIG. 2 is a diagram illustrating an example of a configuration of a base station, according to an embodiment.

As exemplified in FIG. 2, the base station 10 includes a processing device 11, a storage device 12, a LTE IF unit 13, a wireless LAN IF unit 14, and a wired LAN IF unit 15, which are connected to one another through a bus BU1. "IF" is an abbreviation for "interface".

In order to realize a function to be described later, the processing device 11 controls individual units in the base station 10. In the embodiment, the processing device 11 is a central processing unit (CPU). In the embodiment, the processing device 11 executes a program stored in the storage device 12, thereby realizing the function to be described later.

Note that the function of the processing device 11 may be realized by an large scale integration (LSI) or a programmable logic circuit device (programmable logic device: PLD).

The storage device 12 includes at least one of, for example, a RAM, a ROM, an HDD, an SSD, a semiconductor memory, and an organic memory. The RAM is an abbreviation for "random access memory". The ROM is an abbreviation for "read only memory". The HDD is an abbreviation for "hard disk drive". The SSD is an abbreviation for "solid state drive". Note that the storage device 12 may include a recording medium, such as a flexible disk, an optical disk, a magneto-optical disk, or a semiconductor memory, and a reading device capable of reading information from the recording medium.

The LTE IF unit 13 includes an antenna, not illustrated, and performs the first communication (in the embodiment, LTE communication) conforming to the LTE method with the wireless terminals 21 and 22 through the antenna. In the embodiment, a digital signal processor (DSP) executes a preliminarily held program, thereby realizing a function of the LTE IF unit 13. Note that the function of the LTE IF unit 13 may be realized by an LSI.

The wireless LAN IF unit 14 includes an antenna, not illustrated, and performs the second communication (in the embodiment, wireless LAN communication) conforming to the wireless LAN method, with the wireless terminals 21 and 22. In the embodiment, a DSP executes a preliminarily held program, thereby realizing a function of the wireless LAN IF unit 14. Note that the function of the wireless LAN IF unit 14 may be realized by an LSI.

The LTE IF unit 13 and the wireless LAN IF unit 14 are an example of a communication unit capable of performing the first communication and the second communication.

The wired LAN IF unit 15 includes a communication port, to which a communication cable is connectable, and the wired LAN IF unit 15 is connected to the communication network NW via the communication cable, thereby performing communication conforming to a wired LAN method, with another device (for example, the server device 30) connected to the communication network NW. The wired LAN method is, for example, an IEEE 802.3 series. The wired LAN method is an example of a wired communication method. The wired LAN method may be, for example, an Ethernet (registered trademark) method.

Configuration: Wireless Terminal 21

Figure 3:
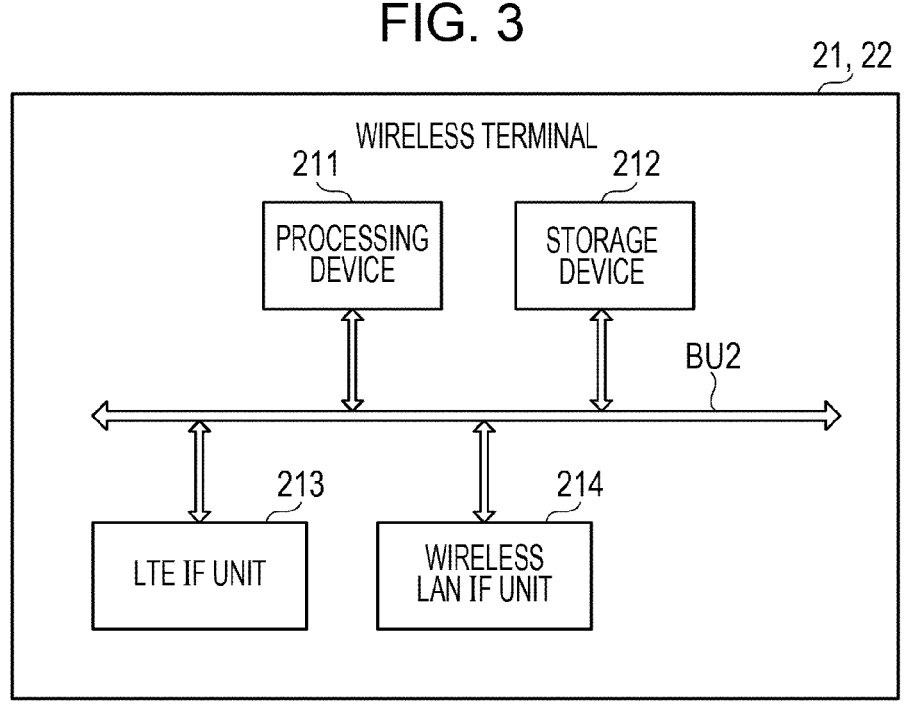
FIG. 3 is a diagram illustrating an example of a configuration of a wireless terminal, according to an embodiment.

As exemplified in FIG. 3, the wireless terminal 21 includes a processing device 211, a storage device 212, an LTE IF unit 213, and a wireless LAN IF unit 214, which are connected to one another through a bus BU2.

In the same way as the processing device 11, in order to realize a function to be described later, the processing device 211 controls individual units in the wireless terminal 21. The storage device 212 has a function similar to that of the storage device 12.

The LTE IF unit 213 includes an antenna, not illustrated, and performs the first communication (in the embodiment, the LTE communication) conforming to the LTE method, with the base station 10 through the antenna.

The wireless LAN IF unit 214 includes an antenna, not illustrated, and performs the second communication (in the embodiment, the wireless LAN communication) conforming to the wireless LAN method, with the base station 10.

The wireless terminal 22 has a function similar to that of the wireless terminal 21.

Configuration: Server Device 30

In the embodiment, the server device 30 includes a processing device, a storage device, and a wired LAN IF unit, which are similar to the processing device 11, the storage device 12, and the wired LAN IF unit 15, respectively, and are not illustrated. The wired LAN IF unit included in the server device 30 is connected to the communication network NW, thereby performing communication with another device (for example, the base station 10) connected to the communication network NW.

Function: Base Station 10

Next, a function of the base station 10 will be described. As exemplified in FIG. 4, the function of the base station 10 includes a packet distribution processing unit 110. The packet distribution processing unit 110 is an example of a control unit that controls allocation of wireless resources of the first and second communications. Furthermore, as exemplified in FIG. 4, the functions of the LTE IF unit 13 include a discarded amount detection unit 131. The discarded amount detection unit 131 is an example of a detection unit.

Figure 4:
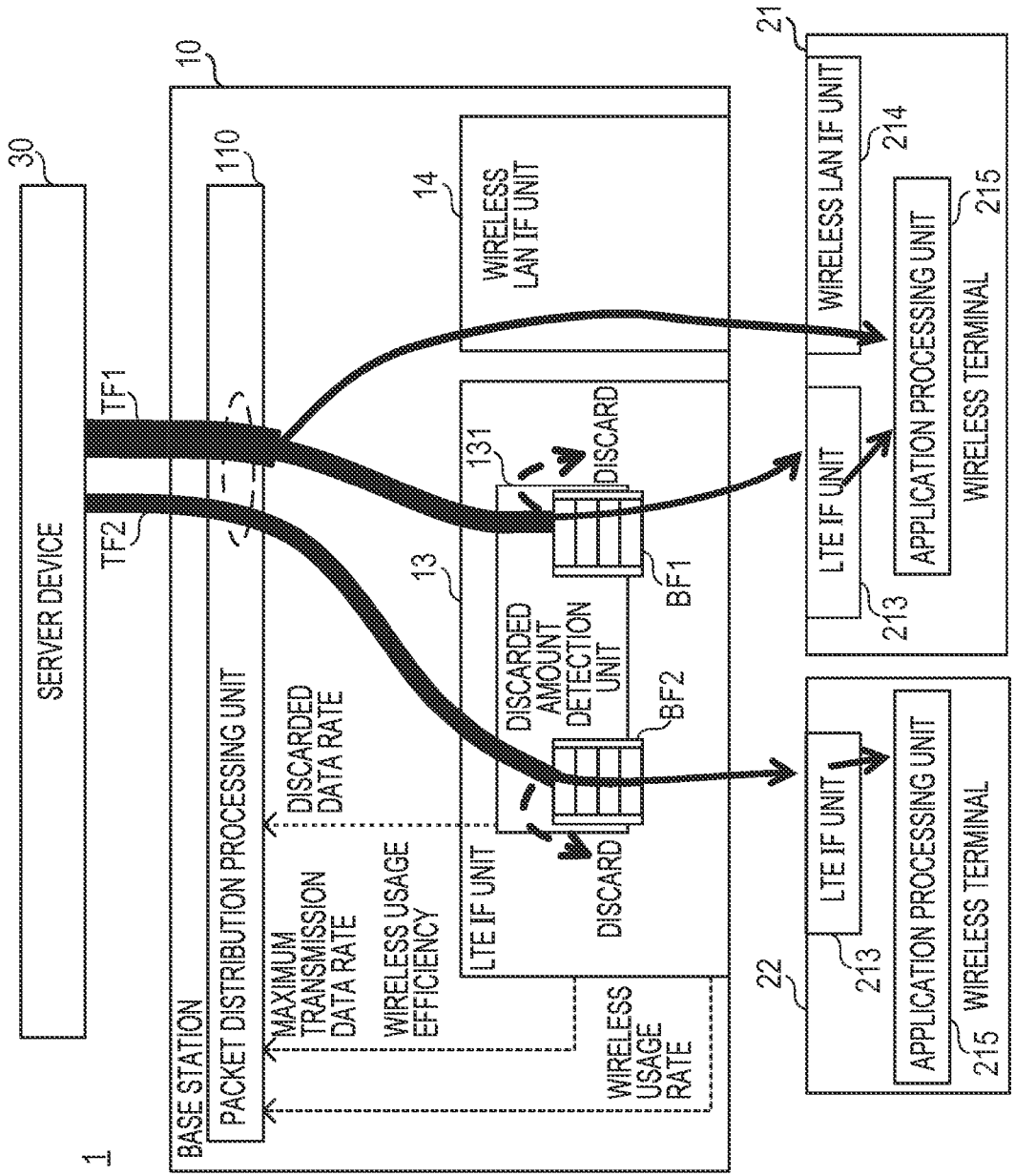
FIG. 4 is a diagram illustrating an example of a function of a wireless communication system, according to an embodiment.

The packet distribution processing unit 110 receives, from the server device 30, packets belonging to a communication flow. In the embodiment, the packets each include data. In the embodiment, the communication flow indicates a flow of data from a specific transmission source to a specific transmission destination. In the embodiment, as illustrated in FIG. 4, a case where the packet distribution processing unit 110 receives packets belonging to a communication flow TF1 and packets belonging to a communication flow TF2 is assumed. Note that the communication flows TF1 and TF2 may be transmitted by respective server devices.

A communication flow may be expressed as an IP flow, a traffic flow, or a flow. In the embodiment, the transmission source of the communication flows TF1 and TF2 is the server device 30. The transmission destination of the communication flow TF1 is the wireless terminal 21 and the transmission destination of the communication flow TF2 is the wireless terminal 22.

The packet distribution processing unit 110 detects a reception data rate. In the embodiment, the reception data rate is an amount of data included in packets received by the base station 10 in a unit of time. In the embodiment, the unit of the reception data rate is bits per second (bps). In the embodiment, the reception data rate is an amount of data included in packets that are received by the base station 10 in a unit of time and belong to the communication flow TF1 or TF2. In the embodiment, the packet distribution processing unit 110 detects a reception data rate for each communication flow.

In the embodiment, a case where the wireless terminal 21 is located both within the wireless area for the first communication and within the wireless area for the second communication is assumed. Furthermore, in the embodiment, a case where the wireless terminal 22 is located within the wireless area for the first communication and is located outside of the wireless area for the second communication is assumed.

In the embodiment, the wireless terminal 22 does not have to include the wireless LAN IF unit 214.

In the embodiment, the base station 10 transmits packets to the wireless terminal 21 by performing in parallel the first communication and the second communication. On the other hand, the base station 10 transmits packets to the wireless terminal 22 by performing the first communication without performing the second communication.

A first communication channel used for performing the first communication may be expressed as a first physical line or a first wireless link. In the same way, a second communication channel used for performing the second communication may be expressed as a second physical line or a second wireless link. Performing in parallel the first communication and the second communication is an example of performing link aggregation (LA) communication. The LA communication may be communication performed using, for example, one logical line formed by aggregating communication channels.

In the embodiment, communication different from the LA communication may be expressed as non-LA communication. For example, performing one of the first communication and the second communication is an example of performing a non-LA communication.

In the embodiment, the communication flow TF1 is transmitted based on the LA communication. Accordingly, the communication flow TF1 may be expressed as LA traffic. In addition, the communication flow TF2 is transmitted based on the non-LA communication. Accordingly, the communication flow TF2 may be expressed as non-LA traffic.

The packet distribution processing unit 110 determines a distribution rate for the communication flow TF1 serving as the LA traffic. In the embodiment, the distribution rate is a ratio of the amount of data to be distributed to the first communication to the total amount of respective pieces of data to be distributed to the first and second communications forming the LA communication. Note that, in place of the distribution rate, the packet distribution processing unit 110 may use a distribution ratio indicating a ratio between the amount of data distributed to the first communication and the amount of data distributed to the second communication.

The determination of the distribution rate is an example of determination of the amount of data to be assigned to the wireless resources of the second communication. A determination method for the distribution rate will be described later.

The packet distribution processing unit 110 distributes packets belonging to the communication flow TF1 serving as the LA traffic to the first communication and the second communication in accordance with the determined distribution rate. In the embodiment, the packet distribution processing unit 110 outputs each of the packets belonging to the communication flow TF1 to the LTE IF unit 13 or the wireless LAN IF unit 14 in accordance with the determined distribution rate.

In a case where the distribution rate is, for example, 1/10, the packet distribution processing unit 110 distributes 1 packet on average to the first communication and distributes 9 packets on average to the second communication, with respect to 10 packets belonging to the communication flow TF1.

In the embodiment, the packet distribution processing unit 110 outputs packets belonging to the communication flow TF2 serving as the non-LA traffic to the LTE IF unit 13 without outputting the packets belonging to the communication flow TF2 to the wireless LAN IF unit 14.

The wireless LAN IF unit 14 transmits, to the wireless terminal 21, packets input from the packet distribution processing unit 110 by using the second communication.

The LTE IF unit 13 transmits, to the wireless terminals 21 and 22, packets input from the packet distribution processing unit 110 by using the first communication.

In the embodiment, the LTE IF unit 13 includes buffers BF1 and BF2. The LTE IF unit 13 causes the buffer BF1 to hold packets belonging to the communication flow TF1 from among the input packets. Furthermore, the LTE IF unit 13 causes the buffer BF2 to hold packets belonging to the communication flow TF2 from among the input packets.

The LTE IF unit 13 assigns the packets held by the buffers BF1 and BF2 to wireless resources in the first communication. Using wireless resources allocated to the packets, the LTE IF unit 13 transmits the packets. The LTE IF unit 13 erases packets assigned to the wireless resources from the buffers BF1 and BF2. The erasing from the buffers BF1 and BF2 may be expressed as termination of holding by the buffers BF1 and BF2.

In a case where it is difficult to cause the buffers BF1 and BF2 to hold input packets, the LTE IF unit 13 discards the input packets or packets held in the buffers BF1 and BF2 without transmitting the input packets or the packets held in the buffers BF1 and BF2. In other words, within data included in the packets input to the LTE IF unit 13, data different from data assigned to the wireless resources of the first communication (for example, data not assigned to the wireless resources of the first communication) is discarded.

Note that data included in the packets input to the LTE IF unit 13 is an example of transmission data.

With respect to each of wireless terminals serving as transmission destinations of packets, the discarded amount detection unit 131 detects a discarded amount indicating an amount of data included in packets that have been discarded without being transmitted among packets input to the LTE IF unit 13. In the embodiment, every time a time period including a predetermined measurement time elapses, the discarded amount detection unit 131 detects a discarded amount in the time period. In the embodiment, the measurement time has the same length as that of a determination period.

The discarded amount is an example of an unallocated data amount indicating an amount of data that is different from data allocated to the wireless resources of the first communication (for example, an amount of data not allocated to the wireless resources of the first communication) among pieces of data included in the packets input to the LTE IF unit 13.

By dividing the discarded amount detected by the discarded amount detection unit 131 by the measurement time with respect to each of wireless terminals of transmission destinations of packets, the LTE IF unit 13 calculates a discarded data rate indicating the discarded amount per unit of time. In the embodiment, the unit of the discarded data rate is bits per second (bps). The LTE IF unit 13 outputs the calculated discarded data rate to the packet distribution processing unit 110. Note that the calculation is an example of detection.

The LTE IF unit 13 detects a wireless usage rate indicating a ratio of the amount of wireless resources allocated to data transmitted in the first communication to the total amount of wireless resources available in the first communication, and outputs the detected wireless usage rate to the packet distribution processing unit 110. Note that the detection may be expressed as measurement.

The amount of wireless resources may be expressed by, for example, the number of physical resource blocks (PRBs). In the embodiment, the wireless usage rate is a real number ranging from 0 to 1, and is a dimensionless quantity. In the embodiment, the physical resource block is a wireless resource that is identified by a frequency bandwidth (for example, 180 kHz) corresponding to 12 subcarriers in an OFDM method and a time period (for example, 1 ms) corresponding to 2 slots. The OFDM is an abbreviation for "orthogonal frequency-division multiplexing".

The amount of wireless resources corresponding to the wireless usage rate is an example of an allocated resource amount indicating an amount of wireless resources of the first communication, which have been allocated to data included in the packets input to the LTE IF unit 13.

For each of wireless terminals of transmission destinations, the LTE IF unit 13 detects a maximum transmission data rate indicating an amount of data that is transmittable in a unit of time in a case where the wireless usage rate is "1" as a result of allocating all the wireless resources to each wireless terminal in the first communication. In addition, the LTE IF unit 13 outputs the detected maximum transmission data rate to the packet distribution processing unit 110.

The maximum transmission data rate varies depending on a modulation and coding method used for the first communication. The modulation and coding method indicates a combination of a modulation method and a coding rate. The modulation and coding method may be expressed as a modulation and coding scheme (MCS). In the embodiment, the LTE IF unit 13 preliminarily holds a relationship between MCSs and maximum transmission data rates, and detects the maximum transmission data rate, based on the held relationship and the MCS used for the first communication.

The modulation and coding method is determined in accordance with, for example, communication quality. The communication quality may be expressed as a reception quality of a radio signal. The communication quality varies depending on wireless terminals of transmission destinations. Accordingly, the modulation and coding method used for the first communication varies depending on the wireless terminals of transmission destinations. Therefore, the maximum transmission data rate varies depending on the wireless terminals of transmission destinations.

Furthermore, for each of wireless terminals of transmission destinations of packets, the LTE IF unit 13 detects a wireless usage efficiency indicating a wireless usage rate per unit data rate, and outputs the detected wireless usage efficiency to the packet distribution processing unit 110. In the embodiment, the unit of the wireless usage efficiency is 1/bps. In the embodiment, the wireless usage efficiency is a real number. The wireless usage efficiency may be expresses as a unit wireless usage rate. The amount of wireless resources corresponding to the wireless usage efficiency in the first communication is an example of an amount of wireless resources of the first communication, to which a predetermined amount (for example, a unit amount) of data is allocated.

In the embodiment, the LTE IF unit 13 calculates the reciprocal of the maximum transmission data rate as wireless usage efficiency.

The maximum transmission data rate increases with an increase in the communication quality. Accordingly, the wireless usage efficiency decreases with an increase in the communication quality. In the embodiment, decrease in the wireless usage efficiency indicates decrease in the wireless usage rate required for transmitting a predetermined amount of data.

Note that, in place of the LTE IF unit 13, the packet distribution processing unit 110 may calculate the wireless usage efficiency.

Next, a determination method for the distribution rate will be described.

The packet distribution processing unit 110 determines a distribution rate, based on a virtual wireless usage rate and a predetermined target value of the wireless usage rate. The target value may be set so as to suppress the occurrence of congestion in the first communication. Discarding of packets may be an example of the congestion. In addition, a state in which a bit error rate for received packets exceeds a predetermined threshold value may be an example of the congestion. In the embodiment, the packet distribution processing unit 110 determines a distribution rate every time the predetermined determination period elapses.

In the embodiment, the virtual wireless usage rate indicates a value obtained by adding, to the wireless usage rate detected by the LTE IF unit 13, the wireless usage rate assumed to be used in a case where discarded packets are transmitted on the first communication.

The amount of wireless resources corresponding to the virtual wireless usage rate is an example of the amount of wireless resources that are scheduled to be used for allocating packets input to the LTE IF unit 13 to wireless resources of the first communication. The amount of wireless resources corresponding to the virtual wireless usage rate is the sum of, for example, the amount of wireless resources allocated to packets transmitted in the first communication and the amount of wireless resources assumed to be used for discarded packets in a case where discarded packets are transmitted on the first communication. In other words, the amount of wireless resources corresponding to the virtual wireless usage rate may be the amount of wireless resources required for transmitting data distributed to the first communication.

In addition, an amount obtained by subtracting the amount of wireless resources assigned to packets transmitted in the first communication from the total amount of wireless resources available in the first communication is an example of the amount of free wireless resources.

Based on Mathematical Expression 1 and a wireless usage rate $U_m$ detected by the LTE IF unit 13, the packet distribution processing unit 110 calculates a virtual wireless usage rate $U_v$.

$$U_v = U_m + \sum_{i=1}^{N} \left(\frac{D_i}{M_i}\right) \quad \text{(Expression 1)}$$

$M_i$ indicates a maximum transmission data rate for an i-th wireless terminal, detected by the LTE IF unit 13. Accordingly, $1/M_i$ indicates a wireless usage efficiency for the i-th wireless terminal. "i" indicates an integer ranging from 1 to N. N indicates the number of wireless terminals serving as transmission destinations of packets. $D_i$ indicates a discarded data rate for the i-th wireless terminal, calculated by the LTE IF unit 13.

In the embodiment, the number, N, of wireless terminals serving as transmission destinations of packet is "2". Accordingly, in the embodiment, Mathematical Expression 1 is expressed by Mathematical Expression 2. In the embodiment, the first wireless terminal is the wireless terminal 21 and the second wireless terminal is the wireless terminal 22.

$$U_v = U_m + \frac{D_1}{M_1} + \frac{D_2}{M_2} \quad \text{(Expression 2)}$$

In the embodiment, a value, $D_1/M_1$, in Mathematical Expression 2 indicates a wireless usage rate corresponding to a discarded amount for the wireless terminal 21. In the same way, a value, $D_2/M_2$, in Mathematical Expression 2 indicates a wireless usage rate corresponding to a discarded amount for the wireless terminal 22.

The packet distribution processing unit 110 determines a distribution rate a, based on Mathematical Expression 3, a detected reception data rate $R_1$ of the communication flow TF1, a maximum transmission data rate $M_1$ for the wireless terminal 21 which is detected by the LTE IF unit 13, a calculated virtual wireless usage rate $U_v$, and a target value $U_t$ of a wireless usage rate. As illustrated in Mathematical Expression 3, the distribution rate a is calculated in accordance with a difference between the virtual wireless usage rate $U_v$ and the target value $U_t$.

$$\alpha = 1 - \frac{M_1(U_v - U_t)}{R_1} \quad \text{(Expression 3)}$$

In the embodiment, a value, $M_1(U_v-U_t)$, in Mathematical Expression 3 indicates an amount corresponding to the difference between the virtual wireless usage rate $U_v$ and the target value $U_t$ of data transmitted to the wireless terminal 21 in a unit of time. In other words, the amount of data that is transmitted to the wireless terminal 21 in a unit of time and corresponds to a predetermined wireless usage rate is calculated by multiplying the relevant predetermined wireless usage rate by the maximum transmission data rate $M_1$ for the wireless terminal 21.

In a case where the packet distribution processing unit 110 uses a distribution ratio in place of a distribution rate, the distribution ratio may be expressed as Mathematical Expression 4. $\beta_{LTE}$ indicates the amount of data distributed to the first communication. $\beta_{WLAN}$ indicates the amount of data distributed to the second communication.

$$\beta_{LTE}:\beta_{WLAN}=R_1-M_1(U_v-U_t):M_1(U_v-U_t) \quad \text{(Expression 4)}$$

In this way, the packet distribution processing unit 110 determines the distribution rate so that the amount of wireless resources scheduled to be used to allocate transmission data to wireless resources of the first communication becomes less than or equal to the amount of available wireless resources. From this, the packet distribution processing unit 110 allocates at least a portion of the transmission data to wireless resources of the second communication in place of the first communication so that the amount of wireless resources scheduled to be used becomes less than or equal to the amount of available wireless resources.

Note that in a case where a wireless usage rate in the second communication is larger than a target value for the second communication, the packet distribution processing unit 110 may increase the distribution rate within a range in which a wireless usage rate in the first communication is less than or equal to a target value for the first communication. According to this, since packets distributed to the second communication decreases, it is possible to suppress the occurrence of congestion in the second communication.

In addition, in a case where the wireless usage rate in the first communication is larger than the target value for the first communication and the wireless usage rate in the second communication is larger than the target value for the second communication, the packet distribution processing unit 110 does not have to change the distribution rate.

In addition, in a case where the wireless usage rate in the first communication is larger than the target value for the first communication, the packet distribution processing unit 110 may change the distribution rate regardless of the wireless usage rate in the second communication so that the amount of wireless resources scheduled to be used becomes less than or equal to the amount of available wireless resources of the first communication. According to this, even in a case where it is difficult to measure the wireless usage rate of the second communication, it is possible for the packet distribution processing unit 110 to suppress the occurrence of congestion in the first communication and the second communication as long as there exist available wireless resources for the second communication.

Note that the packet distribution processing unit 110 may receive a plurality of packets belonging to a plurality of LA traffic flows. In this case, for the individual LA traffic flows, the packet distribution processing unit 110 determines the above-mentioned distribution rates in ascending order of communication qualities for wireless terminals of transmission destinations of packets in the first communication. According to this, for an LA traffic flow whose communication quality is relatively low in the first communication, it is possible to largely reduce the number of packets distributed to the first communication, compared with other LA traffic flows. As a result, it is possible to improve a throughput indicating the amount of data transmitted by communication in a unit of time.

In addition, the packet distribution processing unit 110 may receive a plurality of packets belonging to a plurality of non-LA traffic flows.

Function: Wireless Terminal 21

Next, a function of the wireless terminal 21 will be described. As exemplified in FIG. 4, the function of the wireless terminal 21 includes an application processing unit 215.

The wireless terminal 21 aggregates packets received by the LTE IF unit 213 and packets received by the wireless LAN IF unit 214, and outputs the aggregated packets to the application processing unit 215. The application processing unit 215 performs predetermined data processing, based on the input packets.

Operation

Next, an example of an operation of the wireless communication system 1 will be described.

Figure 5:
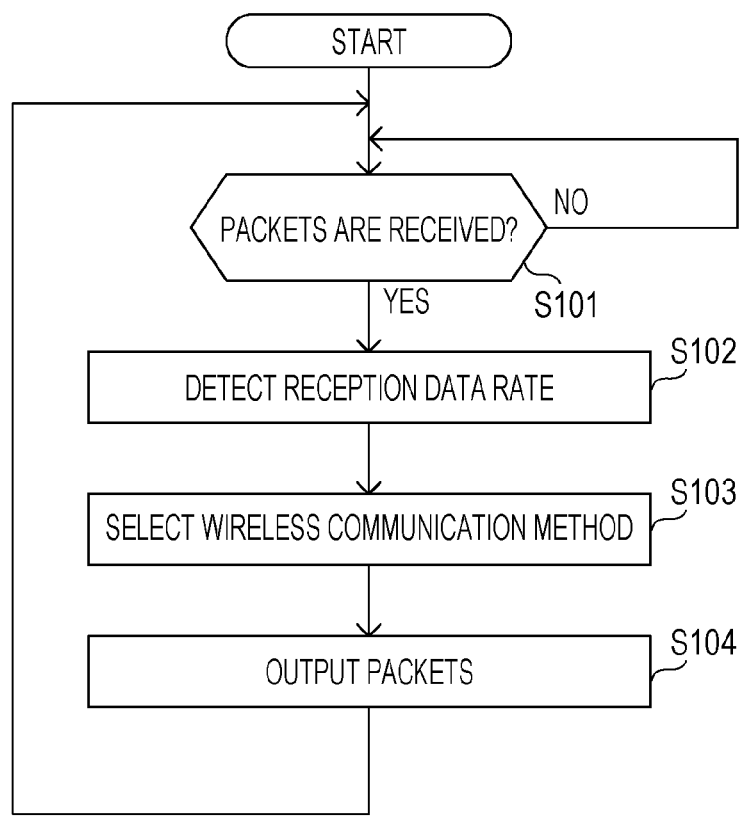
FIG. 5 is a diagram illustrating an example of an operational flowchart for processing performed by a base station, according to an embodiment.

The base station 10 performs processing exemplified by an operational flowchart in FIG. 5. Upon starting the processing in FIG. 5, the base station 10 waits until the wired LAN IF unit 15 receives packets belonging to the LA traffic TF1 ("No" route in step S101 in FIG. 5).

When the wired LAN IF unit 15 receives packets, the base station 10 determines as "Yes" and detects a reception data rate (step S102 in FIG. 5). In the embodiment, the base station 10 calculates, as the reception data rate, a value obtained by dividing the amount of data included in packets received in a time period of the above-mentioned measurement time by the measurement time. Note that the base station 10 may stop detection of the reception data rate during a time period from detecting the reception data rate until the measurement time elapses.

Next, based on a latest distribution rate determined in a step S302 of FIG. 7 which will be described later, the base station 10 selects the first wireless communication method or the second wireless communication method (step S103 in FIG. 5).

In addition, in a case where the first wireless communication method is selected, the base station 10 outputs received packets to the LTE IF unit 13 which transmits the input packets to the wireless terminal 21 by using the first communication.

On the other hand, in a case where the second wireless communication method is selected, the base station 10 outputs received packets to the wireless LAN IF unit 14 (step S104 in FIG. 5) which transmits the input packets to the wireless terminal 21 by using the second communication.

Thereafter, the base station 10 returns to step S101 and repeatedly performs the processing operations in steps S101 to S104.

In this way, packets included in the LA traffic TF1 are distributed to the first and second communications in accordance with the distribution rate, thereby being transmitted from the base station 10 to the wireless terminal 21 by the LA communication.

Note that the base station 10 may perform the processing operation in step S102 at a timing different from the timing exemplified in FIG. 5 (for example, after step S103 or after step S104).

Furthermore, in a case where packets included in the non-LA traffic TF2 are received, the base station 10 transmits the received packets to the wireless terminal 22 by using the non-LA communication (in the embodiment, the first communication).

Figure 6:
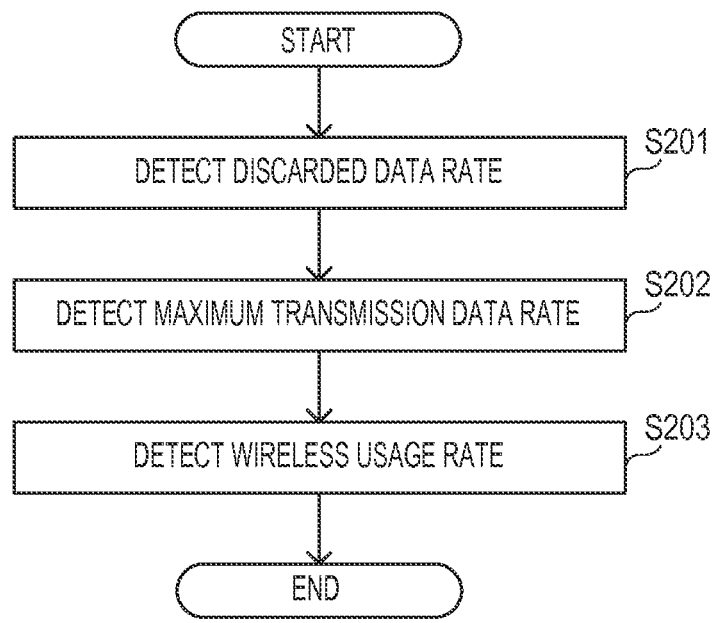
FIG. 6 is a diagram illustrating an example of an operational flowchart for processing performed by a base station, according to an embodiment.

In addition, the base station 10 performs processing exemplified by an operational flowchart in FIG. 6. For example, every time the above-mentioned determination period elapses, the base station 10 may perform processing in FIG. 6.

Upon starting the processing in FIG. 6, the base station 10 detects a discarded data rate of each of the wireless terminals 21 and 22 for the first communication (step S201 in FIG. 6).

Then, the base station 10 detects a maximum transmission data rate of each of the wireless terminals 21 and 22 for the first communication (step S202 in FIG. 6). Furthermore, the base station 10 detects a wireless usage rate for the first communication (step S203 in FIG. 6).

After that, the base station 10 terminates the processing in FIG. 6. Note that the base station 10 may perform processing of steps S201 to S203 in an arbitrary order different from the order exemplified in FIG. 6.

Figure 7:
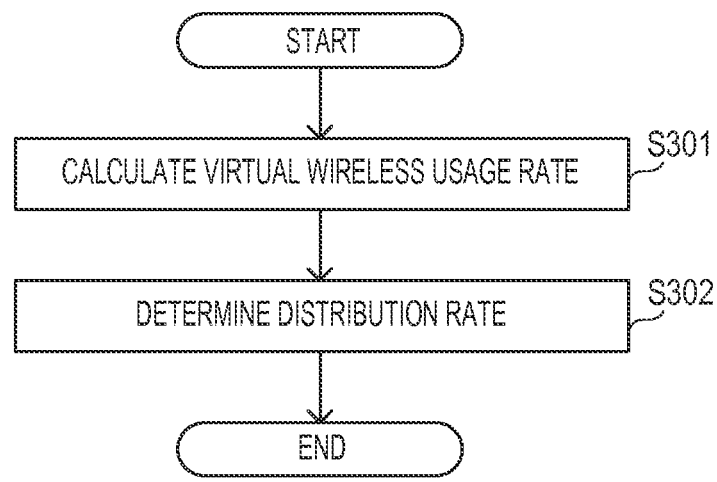
FIG. 7 is a diagram illustrating an example of an operational flowchart for processing performed by a base station, according to an embodiment.

Furthermore, the base station 10 performs processing exemplified by an operational flowchart in FIG. 7. For example, every time the above-mentioned determination period elapses, the base station 10 may perform the processing in FIG. 7.

Upon starting the processing in FIG. 7, the base station 10 calculates a virtual wireless usage rate for the first communication, based on the detected discarded data rate, the detected maximum transmission data rate, and the detected wireless usage rate (step S301 in FIG. 7).

In addition, based on the detected reception data rate, the detected maximum transmission data rate, and the calculated virtual wireless usage rate, the base station 10 determines a distribution rate for the LA traffic TF1 (step S302 in FIG. 7). Thereafter, the base station 10 terminates the processing in FIG. 7.

Note that in a case where the base station 10 receives a plurality of packets belonging to a plurality of LA traffic flows, the base station 10 may independently perform the processing in FIG. 5 to FIG. 7 for each of the plurality of LA traffic flows.

Here, an advantageous effect achieved by the above-mentioned operation of the base station 10 will be described.

First, as exemplified in FIGS. 8A and 8B, there is assumed a case where all packets included in reception traffic are distributed to the LTE communication and after that, a wireless usage rate detected for the LTE communication becomes larger than a target value and less than or equal to "1". The reception traffic includes the LA traffic TF1 and the non-LA traffic TF2.

In the example, there is assumed a case where the wireless usage rate detected for the LTE communication is 0.95, the target value is 0.9, and no packet is discarded. In this case, the base station 10 calculates 0.95 as the virtual wireless usage rate. Accordingly, the base station 10 changes the distribution rate so that the amount of data corresponding to value 0.05 as the wireless usage rate, which is obtained by subtracting the target value of 0.9 from the virtual wireless usage rate of 0.95, is distributed to the wireless LAN communication in place of the LTE communication.

This allows the amount of data corresponding to the wireless usage rate of 0.05 to be transmitted from the base station 10 to the wireless terminal 21 via the wireless LAN communication in place of the LTE communication. As a result, as exemplified in FIG. 8C, the wireless usage rate detected for the LTE communication becomes less than or equal to the target value, thereby improving a throughput.

Next, as exemplified in FIGS. 9A and 9B, there is assumed a case where all the packets included in reception traffic are distributed to the LTE communication and thereafter, a wireless usage rate detected for the LTE communication becomes "1". The reception traffic includes the LA traffic TF1 and the non-LA traffic TF2.

In the example, it is assumed that the wireless usage rate detected for the LTE communication is 1.0, the target value is 0.9, and there exist packets that belong to each of the LA traffic TF1 and the non-LA traffic TF2 and are discarded. It is also assumed that a wireless usage rate corresponding to a discarded amount for each of the LA traffic TF1 and the non-LA traffic TF2 is 0.5.

In this case, the base station 10 calculates 1.5 as the virtual wireless usage rate. Accordingly, the base station 10 changes the distribution rate so that the amount of data corresponding to the wireless usage rate of 0.6 which is obtained by subtracting the target value of 0.9 from the virtual wireless usage rate of 1.5 is distributed to the wireless LAN communication in place of the LTE communication.

This allows the amount of data corresponding to the wireless usage rate of 0.6 to be transmitted from the base station 10 to the wireless terminal 21 via the wireless LAN communication in place of the LTE communication. As a result, as exemplified in FIG. 9C, the wireless usage rate detected for the LTE communication becomes less than or equal to the target value and no packets turn out to be discarded, thereby improving a throughput.

A comparative example will be described with reference to FIGS. 10A to 10C. In the comparative example, in Mathematical Expression 3 used for determining a distribution rate, the base station 10 uses the detected wireless usage rate in place of the virtual wireless usage rate. Furthermore, as exemplified in FIGS. 10A and 10B, states similar to the respective states exemplified in FIGS. 9A and 9B are assumed. In this case, the base station 10 changes the distribution rate so that the amount of data corresponding to the wireless usage rate of 0.1 which is obtained by subtracting the target value of 0.9 from the detected wireless usage rate of 1.0 is distributed to the wireless LAN communication in place of the LTE communication.

In this way, the amount of data corresponding to the wireless usage rate of 0.1 is transmitted from the base station 10 to the wireless terminal 21 via the wireless LAN communication in place of the LTE communication. As a result, in the comparative example, as exemplified in FIG. 10C, a state in which the wireless usage rate detected for the LTE communication is greater than the target value is continued and a state in which packets are discarded is continued.

As described above, the base station 10 according to the first embodiment detects an unallocated data amount indicating an amount of transmission data which is different from transmission data allocated to the wireless resources of the first communication among pieces of transmission data distributed to the first communication. Furthermore, based on the detected unallocated data amount, the base station 10 controls a ratio (a distribution rate in the embodiment) of the amount of transmission data distributed to the first communication to the total amount of respective pieces of transmission data distributed to the first communication and the second communication.

This allows the unallocated data amount to be reflected in the distribution rate, thereby determining an adequate distribution rate. As a result, it is possible to suppress the occurrence of transmission data that is difficult to be allocated to the wireless resources in the first communication. In other words, it is possible to control the amount of wireless resources scheduled to be used so that the amount of wireless resources scheduled to be used becomes less than or equal to the amount of available wireless resources. Accordingly, it is possible to improve a throughput.

In addition, the base station 10 according to the first embodiment detects an unallocated data amount for each of wireless terminals of communication destinations in the first communication. Furthermore, the base station 10 determines a distribution rate, based on the detected unallocated data amount, and the amount of wireless resources for each of the wireless terminals of communication destinations in the first communication, to which a predetermined amount of transmission data is allocated.

Communication qualities between the base station 10 and the wireless terminals 21 and 22 vary depending on the individual wireless terminals of communication destinations. Accordingly, even in a case where an unallocated data amount is the same among the wireless terminals of communication destinations, in some cases the amount of wireless resources used for transmitting transmission data corresponding to the unallocated data amount varies depending on the individual wireless terminals of communication destinations.

Therefore, according to the base station 10, it is possible to reflect, in the distribution rate, the amount of wireless resources used for transmitting transmission data corresponding to the unallocated data amount for each of the wireless terminals of communication destinations. As a result, it is possible to adequately determine a distribution rate.

Furthermore, the base station 10 according to the first embodiment determines a distribution rate, based on a modulation and coding method used for the first communication.

The amount of wireless resources used for communication of a predetermined amount of data varies in accordance with a modulation and coding method used for the communication. Therefore, according to the base station 10, it is possible to reflect, in the distribution rate, the modulation and coding method used for the first communication. As a result, it is possible to suppress the occurrence of transmission data which is difficult to be allocated to wireless resources in the first communication.

Second Embodiment

Next, a wireless communication system according to a second embodiment of the present technology will be described. The wireless communication system according to the second embodiment is different from the wireless communication system according to the first embodiment in that the distribution rate is determined based on the amount of wireless resources used for retransmission of data. Hereinafter, explanation will be performed with being centered at such a difference. Note that, in the description of the second embodiment, a portion to which the same symbol as a symbol used in the first embodiment is assigned is the same or almost the same portion.

Configuration and Function

Figure 11:
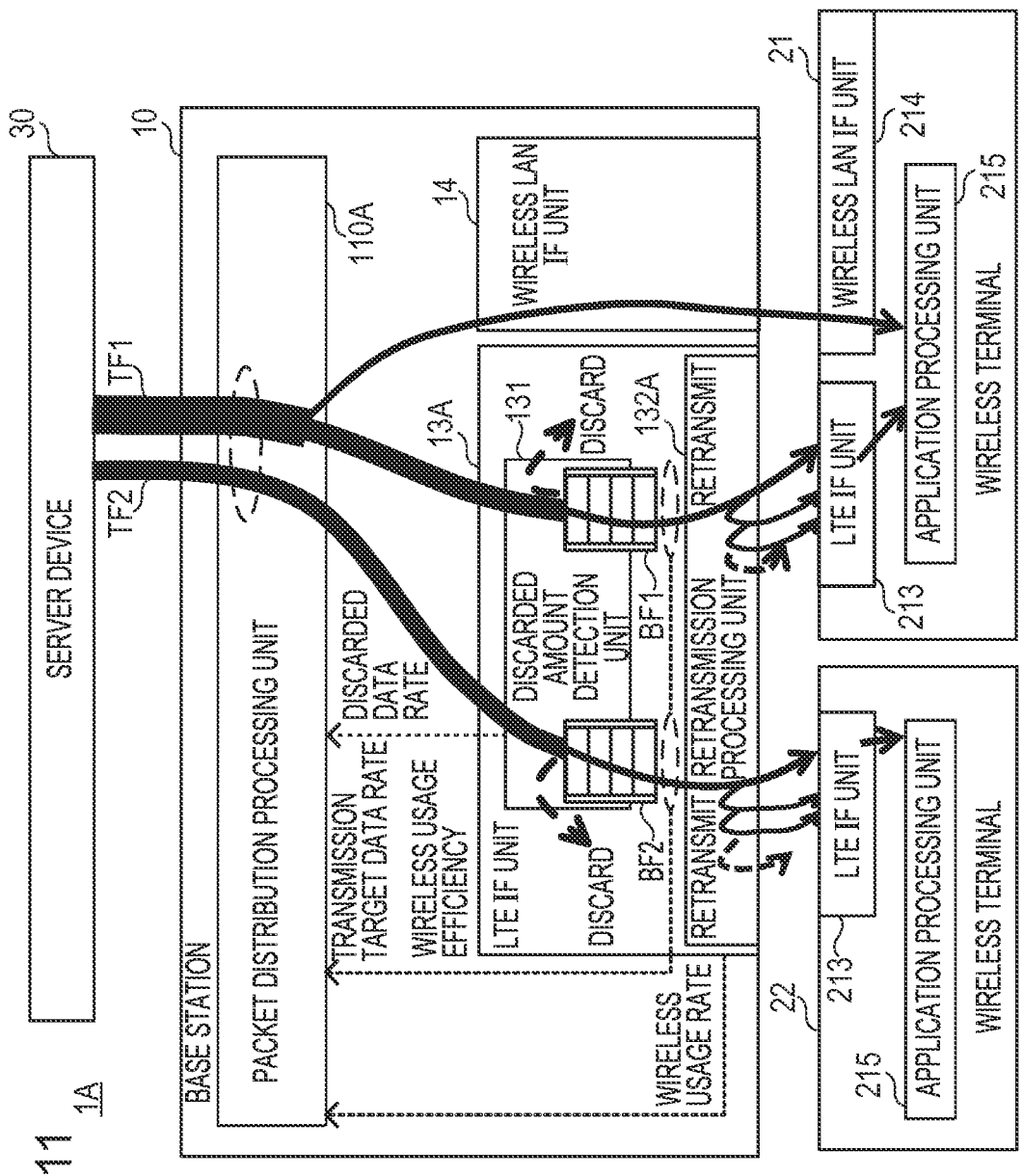
FIG. 11 is a diagram illustrating an example of a function of a wireless communication system, according to an embodiment.

As exemplified in FIG. 11, the base station 10 included in a wireless communication system 1A according to the second embodiment includes an LTE IF unit 13A in place of the LTE IF unit 13.

In addition, functions of the base station 10 include a packet distribution processing unit 110A in place of the packet distribution processing unit 110. Furthermore, functions of the LTE IF unit 13A include a retransmission processing unit 132A in addition to the function of the LTE IF unit 13.

The packet distribution processing unit 110A has a function similar to that of the packet distribution processing unit 110 according to the first embodiment except that a calculation method for the virtual wireless usage rate and a determination method for the distribution rate are different.

The LTE IF unit 13A has functions similar to those of the LTE IF unit 13 according to the first embodiment except for the following first to third differences:

1) The first difference is a point that the wireless usage rate is detected for each of wireless terminals of transmission destinations of packets;

2) The second difference is a point that the retransmission processing unit 132A is provided in addition to the function of the LTE IF unit 13; and 3) The third difference is a point that the wireless usage efficiency is calculated based on a transmission target data rate, which will be described later, and the wireless usage rate, in place of the maximum transmission data rate.

Hereinafter, the individual differences will be described.

The LTE IF unit 13A detects a wireless usage rate for each of wireless terminals of transmission destinations of packets and outputs the detected wireless usage rate to the packet distribution processing unit 110A.

The retransmission processing unit 132A transmits packets in the first communication, and in a case where packets are not correctly received by the wireless terminal 21 or 22 of a transmission destination, the retransmission processing unit 132A performs transmission processing including control of retransmitting the packets. In the embodiment, the retransmission processing unit 132A performs the transmission processing in accordance with a hybrid automatic repeat request (HARQ) method.

In the embodiment, in the transmission processing, the retransmission processing unit 132A acquires packets held in the buffers BF1 and BF2. The retransmission processing unit 132A erases the acquired packets from the buffers BF1 and BF2. Acquisition of packets by the retransmission processing unit 132A may be expressed as inputting packets to the retransmission processing unit 132A.

In the transmission processing, the retransmission processing unit 132A allocates the acquired packets to wireless resources in the first communication. In the transmission processing, the retransmission processing unit 132A transmits the packets by using the wireless resources allocated to the packets.

In a case of detecting that, in the transmission processing, transmitted packets are not correctly received by the wireless terminal 21 or 22 of a transmission destination, the retransmission processing unit 132A allocates the packets to wireless resources in the first communication. For example, in a case of receiving a signal indicating that the wireless terminal 21 or 22 of a transmission destination does not correctly receive the packets, the retransmission processing unit 132A may detect that packets have not correctly received by the wireless terminal 21 or 22 of a transmission destination.

In the transmission processing, using wireless resources allocated to packets, the retransmission processing unit 132A retransmits the packets. In a case where the number of times a packet is retransmitted is larger than a predetermined threshold value, the retransmission processing unit 132A may stop the retransmission of the packet. Retransmission may be expressed as resending.

The LTE IF unit 13A detects a transmission target data amount indicating an amount of data included in packets input to the retransmission processing unit 132A, for each of wireless terminals of transmission destinations of the packets. In the embodiment, every time a time period including a predetermined measurement time elapses, the LTE IF unit 13A detects the transmission target data amount during that time period. In the embodiment, the measurement time has the same length as that of a determination period.

The transmission target data amount is an example of an amount of data that is a target of the transmission processing among pieces of data included in the packets input to the LTE IF unit 13A.

The LTE IF unit 13A calculates a transmission target data rate indicating a transmission target data amount per unit of time, by dividing the detected transmission target data amount by the measurement time with respect to each of wireless terminals of transmission destinations of packets. In the embodiment, the unit of the transmission target data rate is bps. The LTE IF unit 13A outputs the calculated transmission target data rate to the packet distribution processing unit 110A.

As described above, the LTE IF unit 13 according to the first embodiment calculates a reciprocal of the maximum transmission data rate as a wireless usage efficiency. In this case, the amount of wireless resources used for retransmission of data is not reflected in the wireless usage efficiency. The amount of wireless resources assumed to be used in a case where a discarded amount of data is transmitted increases with an increase in the amount of wireless resources used for the retransmission of data.

Therefore, the LTE IF unit 13A according to the second embodiment calculates the wireless usage efficiency, based on the transmission target data rate and the wireless usage rate of each of wireless terminals of transmission destinations of packets. This allows the amount of wireless resources used for retransmission of data to be reflected in the wireless usage efficiency.

In the embodiment, the LTE IF unit 13A calculates, as the wireless usage efficiency, a value obtained by dividing the detected wireless usage rate by the detected transmission target data rate, for each of wireless terminals of transmission destinations of packets, and outputs the calculated wireless usage efficiency to the packet distribution processing unit 110A.

The packet distribution processing unit 110A calculates a virtual wireless usage rate $U_v$, based on Mathematical Expression 5 serving as an alternative to Mathematical Expression 1 and a wireless usage rate $U_{m,i}$ detected by the LTE IF unit 13A for an i-th wireless terminal.

$$U_v = \sum_{i=1}^{N} (U_{m,i}) + \sum_{i=1}^{N} \left( \frac{D_i}{H_i / U_{m,i}} \right) \quad \text{(Expression 5)}$$

$H_i$ indicates a transmission target data rate detected by the LTE IF unit 13A for the i-th wireless terminal. Accordingly, $U_{m,i}/H_i$ indicates a wireless usage efficiency for the i-th wireless terminal.

Since the amount of wireless resources used for retransmission of data is reflected in the wireless usage efficiency, a virtual wireless usage rate calculated in the second embodiment increases with an increase in the amount of wireless resources used for retransmission of data.

The packet distribution processing unit 110A determines distribution rate α, based on Mathematical Expression 6 serving as an alternative to Mathematical Expression 3, a detected reception data rate $R_1$ of the communication flow TF1, and a transmission target data rate $H_1$ and a wireless usage rate $U_{m,1}$ which have been detected by the LTE IF unit 13A for the wireless terminal 21. As illustrated in Mathematical Expression 6, the distribution rate α is calculated in accordance with a difference between the virtual wireless usage rate $U_v$ and the target value $U_t$.

$$\alpha = 1 - \frac{\frac{H_1}{U_{m,1}}(U_v - U_t)}{R_1} \quad \text{(Expression 6)}$$

In the embodiment, value $H_1(U_v-U_t)/U_{m,1}$ in Mathematical Expression 6 indicates an amount of data corresponding to a difference between the virtual wireless usage rate $U_v$ and the target value $U_t$, among pieces of data which are correctly received in a unit of time by the wireless terminal 21. In other words, an amount of data corresponding to a predetermined wireless usage rate of data which is correctly received in a unit of time by the wireless terminal 21 is calculated by multiplying value $H_1/U_{m,1}$, which is obtained by dividing the transmission target data rate $H_1$ by the wireless usage rate $U_{m,1}$, by the predetermined wireless usage rate.

Note that the packet distribution processing unit 110A may determine a distribution rate a by using Mathematical Expression 3 in place of Mathematical Expression 6.

In a case where the packet distribution processing unit 110A uses a distribution ratio in place of a distribution rate, the distribution ratio may be expressed as Mathematical Expression 7. $\beta_{LTE}$ indicates the amount of data distributed to the first communication. $\beta_{WLAN}$ indicates the amount of data distributed to the second communication.

$$\beta_{LTE}: \beta_{WLAN} = R_1 - \frac{H_1}{U_{m,1}}(U_v - U_t) : \frac{H_1}{U_{m,1}}(U_v - U_t) \qquad \text{(Expression 7)}$$

Operation

Next, an example of an operation of the wireless communication system 1A will be described.

Figure 12:
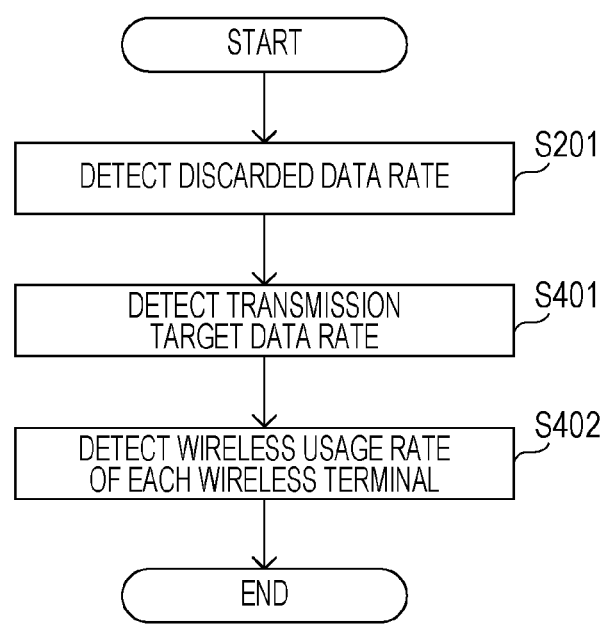
FIG. 12 is a diagram illustrating an example of an operational flowchart for processing performed by a base station, according to an embodiment.

In place of the processing in FIG. 6, the base station 10 according to the second embodiment performs processing exemplified by an operational flowchart in FIG. 12. The processing in FIG. 12 is processing in which the processing operations in steps S202 and S203 within the processing in FIG. 6 are replaced with steps S401 and S402, respectively.

In the same way as the base station 10 according to the first embodiment, after performing the processing operation in the step S201 in FIG. 12, the base station 10 detects the transmission target data rate of each of the wireless terminals 21 and 22 for the first communication (step S401 in FIG. 12). Furthermore, the base station 10 detects the wireless usage rate of each of the wireless terminals 21 and 22 for the first communication (step S402 in FIG. 12).

Furthermore, in the same way as the base station 10 according to the first embodiment, the base station 10 according to the second embodiment performs the processing operations in FIG. 5 and FIG. 7.

As described above, the base station 10 according to the second embodiment detects an unallocated data amount indicating an amount of transmission data that is different from transmission data allocated to the wireless resources of the first communication, among pieces of transmission data distributed to the first communication. Furthermore, based on the detected unallocated data amount, the base station 10 controls a ratio (a distribution rate in the embodiment) of the amount of transmission data distributed to the first communication to the total amount of respective pieces of transmission data distributed to the first communication and the second communication.

According to this, since the unallocated data amount is reflected in the distribution rate, it is possible to adequately determine a distribution rate. As a result, it is possible to suppress the occurrence of transmission data which is difficult to be allocated to wireless resources in the first communication, thereby improving a throughput.

Furthermore, the base station 10 according to the second embodiment detects a wireless usage rate corresponding to an allocated resource amount indicating an amount of wireless resources of the first communication to which transmission data is allocated. In addition, the base station 10 detects a transmission target data amount indicating an amount of transmission data on which the transmission processing is to be performed. Furthermore, the base station 10 determines a distribution rate, based on the detected wireless usage rate and the detected transmission target data amount.

In a case where control of retransmission of transmission data is performed when the transmission data is transmitted but is not correctly received by the wireless terminal 21 or 22, wireless resources are allocated to both transmission data to be newly transmitted and the transmission data to be retransmitted. Accordingly, in a case where a portion of wireless resources scheduled to be used, whose amount exceeds the amount of available wireless resources, is assumed to be transmitted by the first communication, the amount of wireless resources used for the transmission has a strong correlation with an allocated resource amount and a transmission target data amount.

Therefore, according to the base station 10, it is possible to reflect the allocated resource amount and the transmission target data amount in the distribution rate. As a result, it is possible to suppress the occurrence of transmission data that is difficult to be allocated to wireless resources in the first communication. In other words, it is possible to control the amount of wireless resources scheduled to be used so that the amount of wireless resources scheduled to be used becomes less than or equal to the amount of available wireless resources.

A first frequency at which packets are discarded because the number of times the packets are retransmitted becomes larger than the above-mentioned threshold value is lower than a second frequency at which packets are discarded because the buffers BF1 and BF2 fail to hold the packets. For example, from an experimental result, a finding in which the ratio of the first frequency to a frequency at which packets are discarded is about 0% is obtained.

Therefore, according to the base station 10 according to the second embodiment, it is possible to suppress the occurrence of transmission data that is difficult to be allocated to wireless resources in the first communication.

Although the already-described devices or methods in the above-mentioned embodiments are applied to downlink communication, the embodiments may be applied to uplink communication in place of or in addition to the downlink communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
   a communication unit configured to perform in parallel a first communication conforming to a first wireless communication method and a second communication conforming to a second wireless communication method by distributing transmission data to the first communication and the second communication so that first and second transmission data are distributed to the first and second communications, respectively;

a detection unit configured to detect an unallocated data amount indicating an amount of a first portion of the first transmission data that is different from a second portion of the first transmission data that is allocated to wireless resources of the first communication; and a control unit configured to control, based on the detected unallocated data amount, a ratio of an amount of the first transmission data distributed to the first communication, to a total amount of transmission data distributed to both the first and second communications.

2. The apparatus of claim 1, wherein
the first portion of the first transmission data is discarded.

3. The apparatus of claim 1, wherein
the detection unit detects the unallocated data amount for each of destination communication devices serving as communication destinations in the first communication; and
the ratio is determined based on the unallocated data amount detected for each of the destination communication devices in the first communication and an amount of wireless resources of the first communication for each of the destination communication devices, to which a predetermined amount of transmission data is allocated.

4. The apparatus of claim 1, wherein
the ratio is determined based on a modulation and coding scheme used for the first communication.

5. The apparatus of claim 1, wherein
the communication unit:
  detects an allocated resource amount indicating an amount of wireless resources of the first communication to which the second portion of the first transmission data is allocated, and
  detects a transmission target data amount indicating an amount of transmission data on which processing including control of retransmission of transmission data is to be performed when the transmission data is not correctly received by a destination communication device serving as a transmission destination of the first transmission data; and
the ratio is determined based on the detected allocated data amount and the detected transmission target data amount.

6. The apparatus of claim 1, wherein
the detection unit detects an allocated resource amount indicating an amount of wireless resources of the first communication to which the second portion of the first transmission data is allocated; and
the ratio is determined based on the detected allocated resource amount.

7. The apparatus of claim 1, wherein
the transmission data includes a plurality of packets belonging to a communication flow.

8. The apparatus of claim 1, wherein
the first communication method is a Long Term Evolution (LTE) method, and the second communication method is a wireless local area network (LAN) method.

9. A method comprising:
performing in parallel a first communication conforming to a first wireless communication method and a second communication conforming to a second wireless communication method by distributing transmission data to the first communication and the second communication so that first and second transmission data are distributed to the first and second communications, respectively;
detecting an unallocated data amount indicating an amount of a first portion of the first transmission data that is different from a second portion of the first transmission data that is allocated to wireless resources of the first communication; and
controlling, based on the detected unallocated data amount, a ratio of an amount of the first transmission data distributed to the first communication, to a total amount of transmission data distributed to both the first and second communications.

10. The method of claim 9, wherein
the first portion of the first transmission data is discarded.

11. The method of claim 9, wherein
the unallocated data amount is detected for each of destination communication devices serving as communication destinations in the first communication; and
the ratio is determined based on the unallocated data amount detected for each of the destination communication devices in the first communication and an amount of wireless resources of the first communication for each of the destination communication devices, to which a predetermined amount of transmission data is allocated.

12. The method of claim 9, wherein
the ratio is determined based on a modulation and coding scheme used for the first communication.

13. The method of claim 9, further comprising:
detecting an allocated resource amount indicating an amount of wireless resources of the first communication to which transmission data is allocated;
detecting a transmission target data amount indicating an amount of transmission data on which processing including control of retransmission of the transmission data has been performed when the transmission data is not correctly received by a destination communication device serving as a transmission destination of the transmission data;
determining the ratio, based on the detected allocated data amount and the detected transmission target data amount.

* * * * *